(12) United States Patent
Harada et al.

(10) Patent No.: US 9,888,520 B2
(45) Date of Patent: Feb. 6, 2018

(54) USER TERMINAL, RADIO BASE STATION AND COMMUNICATION CONTROL METHOD

(71) Applicant: NTT DOCOMO, INC., Tokyo (JP)

(72) Inventors: Hiroki Harada, Tokyo (JP); Liu Liu, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 27 days.

(21) Appl. No.: 14/909,316

(22) PCT Filed: Jul. 8, 2014

(86) PCT No.: PCT/JP2014/068221
§ 371 (c)(1),
(2) Date: Feb. 1, 2016

(87) PCT Pub. No.: WO2015/016021
PCT Pub. Date: Feb. 5, 2015

(65) Prior Publication Data
US 2016/0183325 A1   Jun. 23, 2016

(30) Foreign Application Priority Data

Aug. 1, 2013   (JP) ................................. 2013-160729

(51) Int. Cl.
*H04W 76/04* (2009.01)
*H04W 16/32* (2009.01)
(Continued)

(52) U.S. Cl.
CPC ......... *H04W 76/048* (2013.01); *H04W 16/16* (2013.01); *H04W 16/32* (2013.01);
(Continued)

(58) Field of Classification Search
CPC .................................................. H04W 76/048
See application file for complete search history.

(56) References Cited

U.S. PATENT DOCUMENTS

| 8,165,175 B2 | 4/2012 | Wang et al. |
| 2014/0171073 A1* | 6/2014 | Kim ...................... H04W 24/10 455/434 |

FOREIGN PATENT DOCUMENTS

WO   2008149534 A1   12/2008

OTHER PUBLICATIONS

European Search Report issued in corresponding European Application No. 14832047.6, dated Feb. 16, 2017 (10 pages).
(Continued)

*Primary Examiner* — John Blanton
(74) *Attorney, Agent, or Firm* — Osha Liang LLP

(57) ABSTRACT

The present invention is designed to allow more reliable small cell detection while preventing the increase of power consumption in user terminals. The communication control method of the present invention includes the steps in which a radio base station that forms a macro cell and/or a small cell notifies a user terminal of transmission configuration information of a detection/measurement signal that is transmitted from the small cell, and discontinuous reception information including a discontinuous reception cycle in the user terminal, and the user terminal configures a detection duration for detecting the detection/measurement signal to overlap at least one transmission duration of the detection/measurement signal, based on the transmission configuration information and the discontinuous reception information.

8 Claims, 18 Drawing Sheets

(51) Int. Cl.
  *H04W 36/00* (2009.01)
  *H04W 52/02* (2009.01)
  *H04W 16/16* (2009.01)
  *H04W 48/16* (2009.01)

(52) U.S. Cl.
  CPC ....... *H04W 36/00* (2013.01); *H04W 52/0216* (2013.01); *H04W 52/0219* (2013.01); *H04W 48/16* (2013.01); *Y02B 60/50* (2013.01)

(56) References Cited

OTHER PUBLICATIONS

Qualcomm Incorporated; "Inter-frequency Small Cell Identification"; 3GPP TSG-RAN2 Meeting #77, R2-120654; Dresden, Germany; Feb. 6-10, 2012 (2 pages).

Renesas Mobile Europe Ltd; "Discovery signals for small cell detection"; 3GPP TSG-RAN WG1 Meeting #72bis, R1-131373; Chicago, USA; Apr. 15-19, 2013 (4 pages).

China Telecom; "Views on Small Cell Discovery"; 3GPP TSG RAN WG1 Meeting #73, R1-132204; Fukuoka, Japan; May 20-24, 2013 (3 pages).

International Search Report issued in corresponding application No. PCT/JP2014/068221 dated Oct. 14, 2014 (4 pages).

Written Opinion of the International Searching Authority issued in corresponding application No. PCT/JP2014/068221 dated Oct. 14, 2014 (4 pages).

CMCC, "Procedures for efficient discovery of small cells"; 3GPP TSG-RAN WG1 #73; R1-132547; Fukuoka, Japan, May 20-24, 2013 (5 pages).

3GPP TR 36.814 V.1.6.0, "3rd Generation Partnership Project; Technical Specification Group Radio Access Network; Further Advancements for E-UTRA Physical Layer Aspects (Release 9)"; Jan. 2010 (6 pages).

* cited by examiner

| 80%≤P_remain≤100% | 50%≤P_remain<80% | 20%≤P_remain<50% | P_remain<20% |
|---|---|---|---|
| m=0 | m=1 | m=2 | m=6 |

FIG.8

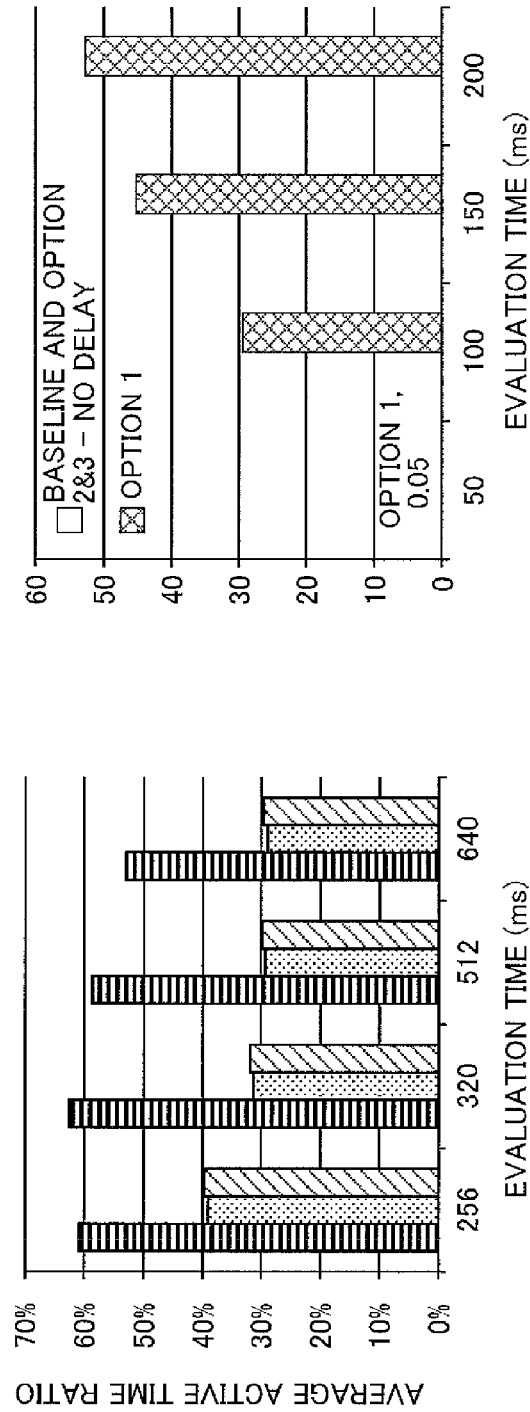

| | UE POWER SAVING | CHANCE TO DETECT DS RATE | UE BEHAVIOR CONTROL | SCHEDULING DELAY |
|---|---|---|---|---|
| BASELINE | BAD, EXCEPT FOR ACTUAL onDuration Timer NEEDED IS 100ms | UNCERTAINTY, <100% (NOTE 2) | NETWORK | NO DELAY |
| OPTION 1 | BETTER COMPARED TO OPTION 2&3 | UNCERTAINTY, <100% | NETWORK | LARGE DELAY |
| OPTION 2 | GOOD (NOTE 1) | CERTAINTY, <100% | UE-SELF | NO DELAY |
| OPTION 3 | | | NETWORK | NO DELAY |

NOTE 1: UE POWER SAVING DEPENDS ON ACTIVE TIME OF DRX
NOTE 2: THE CHANCE TO DETECT DS DEPENDS ON DRX CONFIGURATION

FIG.13

USER TERMINAL, RADIO BASE STATION AND COMMUNICATION CONTROL METHOD

TECHNIQUE FIELD

The present invention relates to a user terminal, a radio base station and a communication control method in a next-generation mobile communication system in which small cells are placed within a macro cell.

BACKGROUND ART

In LTE (Long Term Evolution) and successor systems of LTE (referred to as, for example, "LTE-advanced," "FRA (Future Radio Access)," "4G," etc.), a radio communication system (referred to as, for example, "HetNet" (Heterogeneous Network)) to place small cells (including pico cells, femto cells and so on) having a relatively small coverage of a radius of approximately several meters to several tens of meters, to overlap a macro cell having a relatively large coverage of a radius of approximately several hundred meters to several kilometers, is under study (see, for example, non-patent literature 1).

For this radio communication system, a scenario ("co-channel deployment") to use the same frequency band F1 in both the macro cell and the small cells as shown in FIG. 1 and a scenario ("non-co-channel deployment," "separate frequency deployment," etc.) to use different frequency bands F1 and F2 between the macro cell and the small cells are under study. Also, a scenario to form a small cell cluster with a plurality of small cells without placing a macro cell (without macro coverage) is also under study.

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

In radio communication systems such as those shown in FIG. 1, the PSS (Primary Synchronization Signal), the SSS (Secondary Synchronization Signal), the CRS (Cell-specific Reference Signal) and so on are used as signals for macro cell detection and/or measurements (hereinafter referred to as "detection/measurement reference signals").

Meanwhile, as for signals for small cell detection/measurements, signals apart from the PSS, SSS and CRS are under study for use. To be more specific, detection/measurement signals that take shorter time for detection and that are transmitted in a longer cycle than the PSS, SSS and CRS (for example, discovery signals) are under study for use in small cells. With such detection/measurement signals, it is possible to prevent the increase of power consumption in user terminals pertaining to small cell detection and/or measurements.

However, when detection/measurement signals that are different from the PSS, SSS and CRS are used in small cells in order to prevent the increase of power consumption in user terminals, cases might occur where the user terminals are unable to detect the small cells.

The present invention has been made in view of the above, and it is therefore an object of the present invention to provide a user terminal, a radio base station and a communication control method to allow more reliable detection of small cells while preventing the increase of power consumption in user terminals.

Solution to Problem

A communication control method, according to the present invention, provides a communication control method in a radio communication system where a small cell is arranged within a macro cell, and this communication control method includes the steps in which a radio base station forming the macro cell and/or the small cell notifies a user terminal of transmission configuration information of a detection/measurement signal that is transmitted from the small cell, and discontinuous reception information including a discontinuous reception cycle in the user terminal, and the user terminal configures a detection duration for detecting the detection/measurement signal to overlap at least one transmission duration of the detection/measurement signal, based on the transmission configuration information and the discontinuous reception information.

Advantageous Effects of Invention

According to the present invention, it is possible to allow more reliable small cell detection while preventing the increase of power consumption in user terminals.

BRIEF DESCRIPTION OF DRAWINGS

FIG. 8 is a diagram to explain a communication control method according to a second example of the present embodiment;

FIG. 11 provides diagrams to explain a communication control method according to a third example of the present embodiment;

FIG. 12 provides diagrams to explain advantages of the communication control methods according to the first to third examples of the present embodiment;

FIG. 13 is a diagram to explain advantages of the communication control methods according to the first to third examples of the present embodiment;

DESCRIPTION OF EMBODIMENTS

Figure 1:
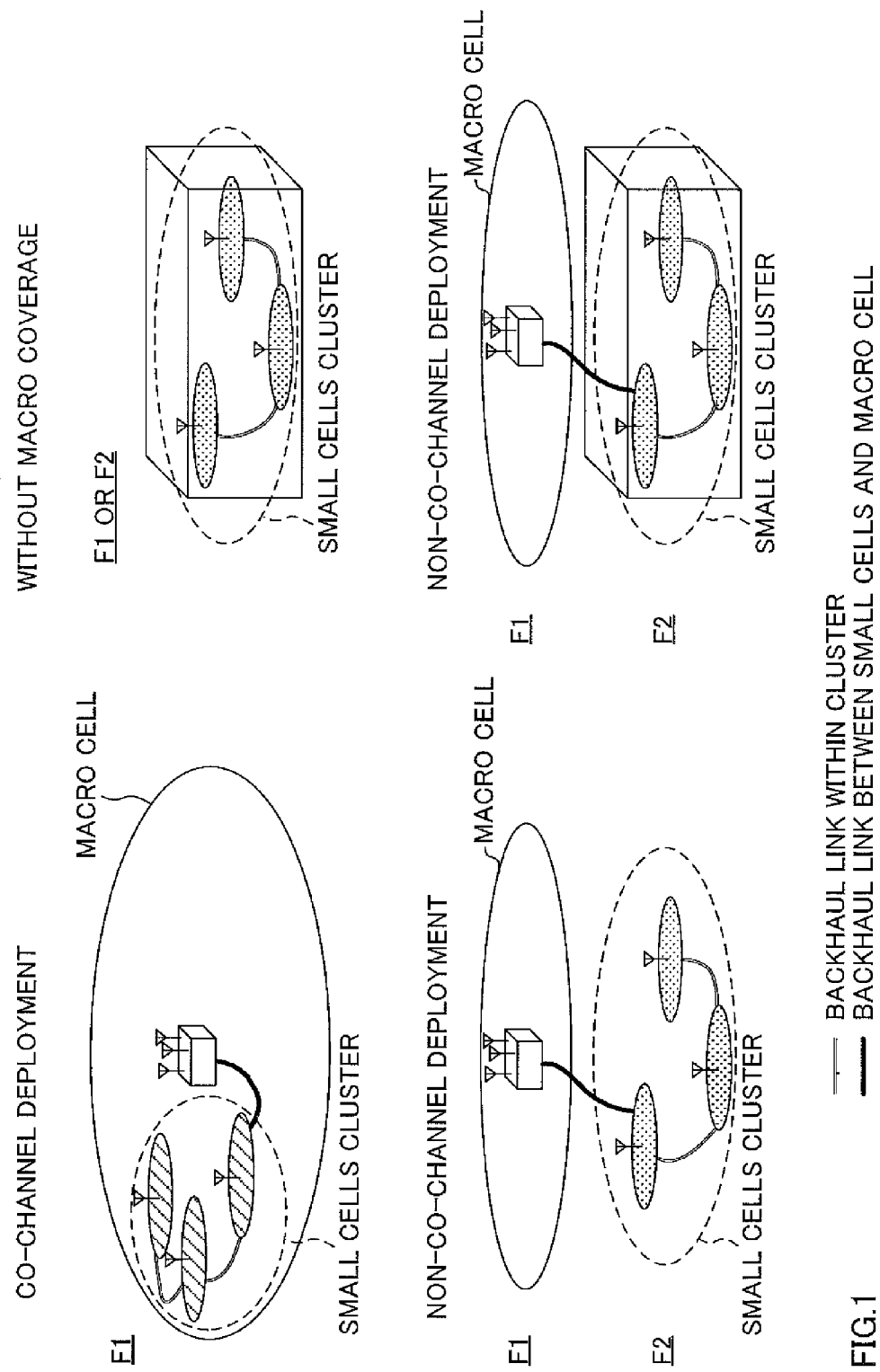
FIG. 1 is a diagram to explain radio communication systems in which small cells are arranged within a macro cell.
Figure 2A:
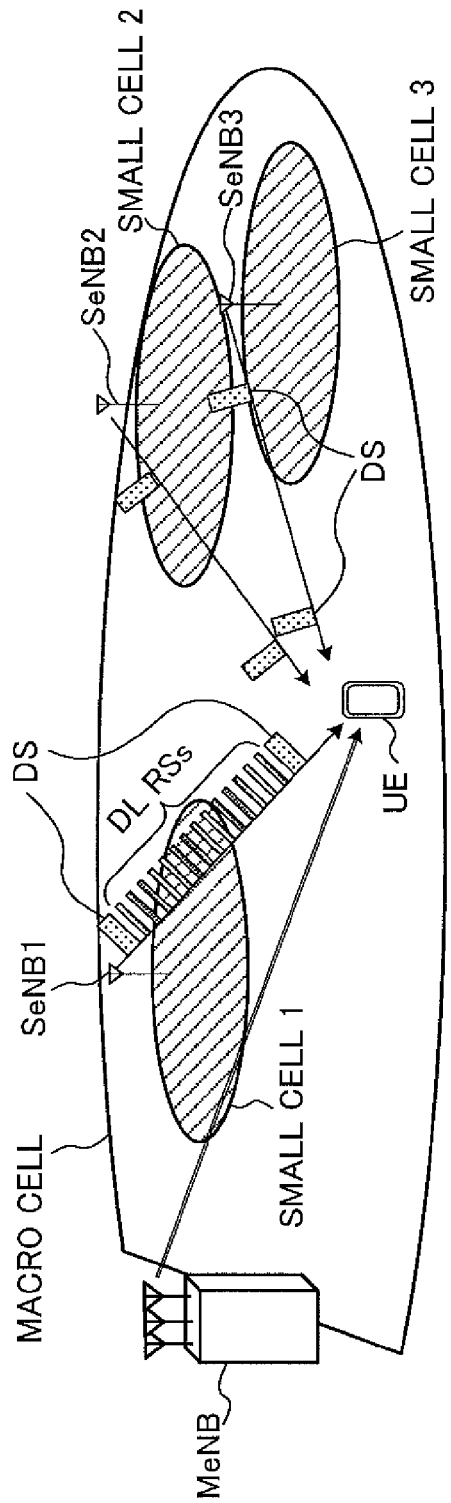
FIG. 2 provides diagrams to explain a radio communication system where introduction of discovery signals is under study.

FIG. 2 provides diagrams to explain a radio communication system where introduction of discovery signals is under study. As shown in FIG. 2A, the radio communication system is comprised of a radio base station that forms a macro cell (hereinafter referred to as "macro base station (MeNB: Macro eNodeB)"), radio base stations 1 to 3 that form small cells (hereinafter referred to as "small base stations (SeNBs: Small eNodeBs)") 1 to 3, and a user terminal (UE: User Equipment).

In the radio communication system shown in FIG. 2A, a relatively low frequency (carrier) F1 such as, for example, 800 MHz or 2 GHz is used in the macro cell, and a relatively high frequency (carrier) F2 such as, for example, 3.5 GHz or 10 GHz is used in the small cells 1 to 3. Note that FIG. 2A is simply an example, and the same frequency (carrier) may be used between the macro cell and the small cells 1 to 3.

In the radio communication system shown in FIG. 2A, the user terminal communicates with the macro base station. Also, the user terminal detects the small cells 1 to 3 based on the discovery signals (DSs) from the small base stations 1 to 3. The discovery signal here is a small cell detection/measurement signal, and may be configured by updating reference signals such as the CSI-RS (Channel State Information-Reference Signal) and the PRS (Positioning Reference Signal), or may be configured anew.

Figure 2B:
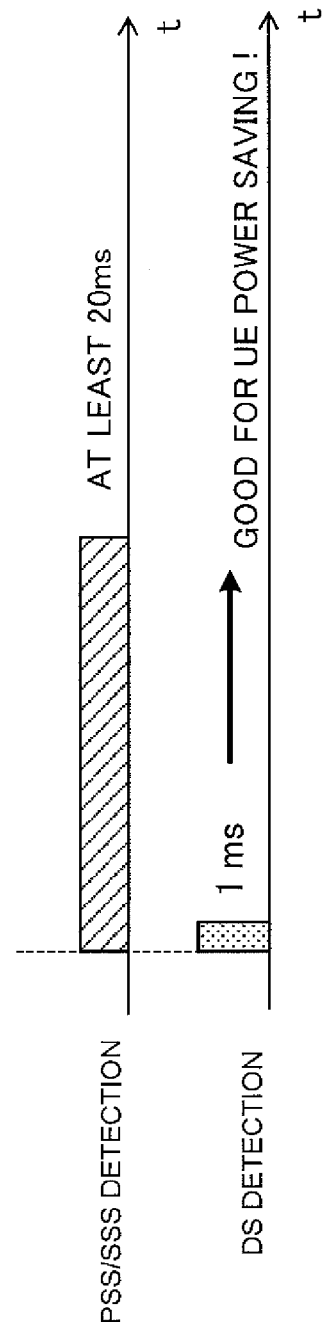

Also, in the radio communication system shown in FIG. 2A, the discovery signal is arranged in subframes in a higher resource density than the macro cell detection/measurement signals (for example, the PSS, SSS, etc.) and with inter-cell orthogonality. Consequently, as shown in FIG. 2B, the time the user terminal takes to detect the discovery signal is shorter than the time it takes to detect the PSS or the SSS. As a result of this, when the discovery signal is used as a small cell detection/measurement signal, it is possible to prevent the increase of power consumption which the user terminal requires for measurements, compared to the case of using the PSS or the SSS.

Figure 3:
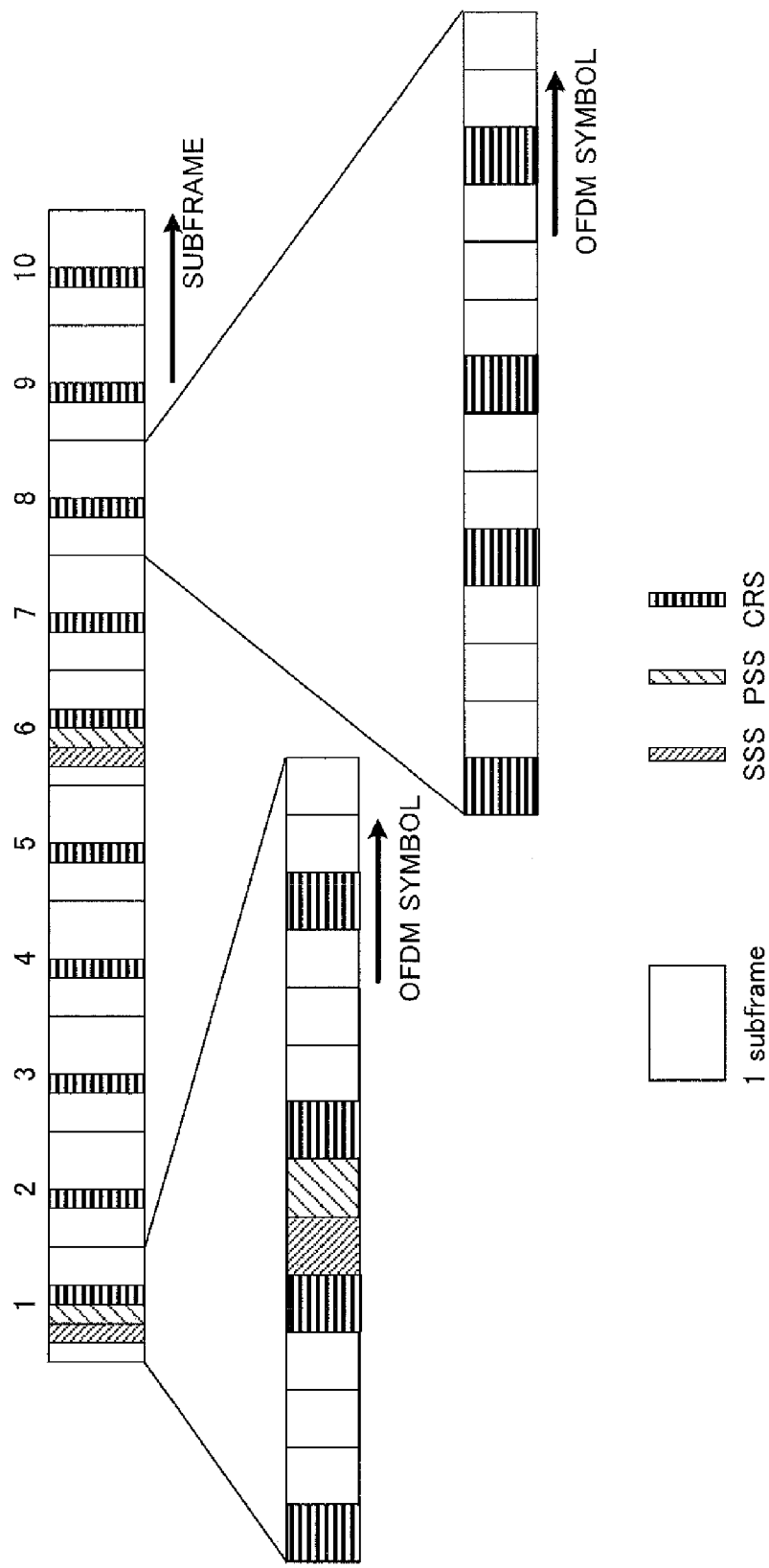
FIG. 3 is a diagram to explain the CRS, PSS and SSS transmission cycles.

Also, the discovery signal is under study for transmission in a longer cycle than macro cell detection/measurement signals (for example, the PSS, SSS, CRS, etc.). As shown in FIG. 3, the CRS is transmitted in every subframe, and the PSS and SSS are transmitted every five subframes. To be more specific, subframes 1 and 6 where the PSS, SSS and CRS are arranged, and subframes 2 to 5 and 7 to 10 where the CRS is arranged, are provided in a radio frame. In subframes 1 and 6, the CRS is arranged in four OFDM symbols, the SSS is arranged in the sixth OFDM symbol and the PSS is arranged in the seventh OFDM symbol. Also, in subframes 2 to 5 and 7 to 10, the CRS is arranged in four OFDM symbols. By contrast with this, the discovery signal is being studied for transmission per, for example, 100 subframes (100 ms cycle). In this case, it is possible to prevent the increase of overhead due to the transmission of the discovery signal and the increases of interference which the discovery signal causes against user terminals in nearby cells.

Here, when a user terminal receives a detection/measurement signal (for example, the PSS, the SSS, the CRS, the discovery signal and so on), discovers the detection/measurement signal and measures its received quality, this is referred to as "measurements" used herein. If the received quality of the detection/measurement signal in the user terminal fulfills predetermined quality, a cell is detected. Note that the received quality that is measured in the user terminal is, for example, the RSRP (Reference Signal Received Power), the RSRQ (Reference Signal Received Quality), the SINR (Signal to Interference plus Noise Ratio) and so on.

Also, the measurements include inter-frequency measurements and intra-frequency measurements. Inter-frequency measurements refers to receiving detection/measurement signals that are transmitted in different frequencies and measuring the received quality of the detection/measurement signals. On the other hand, intra-frequency measurements refers to receiving detection/measurement signals that are transmitted in the same frequency and measuring the received quality of the detection/measurement signals.

In the radio communication system shown in FIG. 2A, the user terminal caries out discontinuous reception (DRX) control to switch on the receiving circuit in a predetermined cycle. In DRX control, in one or more ON durations to switch on the receiving circuit, the user terminal measures the received quality of detection/measurement signals (for example, the discovery signal and so on) transmitted in the communicating frequencies F1 and F2, and detects small cells. On the other hand, in one or more OFF durations, the user terminal switches off the receiving circuit to reduce the power consumption.

Figure 4:
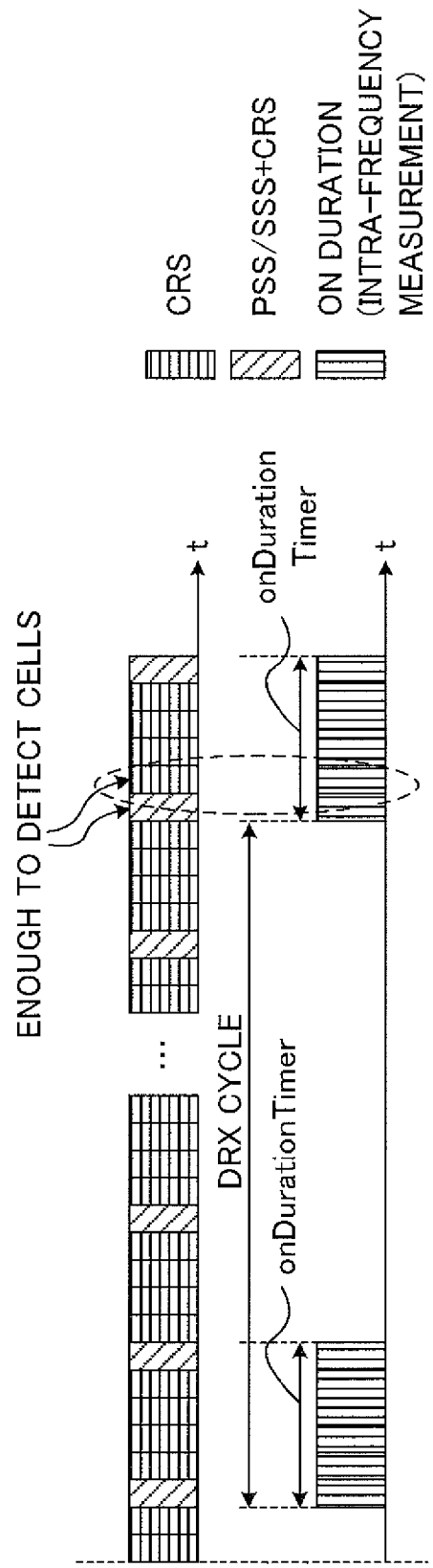
FIG. 4 provides diagrams to explain frequency measurements using the CRS, PSS and SSS.

Intra-frequency measurements using the PSS, SSS and CRS will be described with reference to FIG. 4. As shown in FIG. 4, in intra-frequency measurements, ON durations are configured based on an on-duration timer (onDuration-Timer), a DRX cycle and a DRX start offset.

Here, the on-duration timer refers to the length of time of an ON duration. Also, the DRX cycle shows the cycle of repeating ON durations and OFF durations (discontinuous reception cycle). As shown in FIG. 4, the DRX start offset is the start offset from the top of a radio frame to the beginning of a measurement gap, and represents the time of an ON duration. The on-duration timer, the DRX cycle and the DRX start offset are notified to the user terminal through, for example, higher layer signaling such as RRC signaling.

In FIG. 4, the CRS is transmitted in every subframe, and the PSS and SSS are transmitted every five subframes. The user terminal can receive the CRS, PSS and SSS in ON durations. Consequently, when the CRS, PSS and SSS and so on are used as small cell detection/measurement signals, small cells can be detected.

On the other hand, when the discovery signals is used as a small cell detection/measurement signal, executing the DRX control shown in FIG. 4 might result in the situation where small cells cannot be detected. Intra-frequency measurements using the discovery signal will be described with reference to FIG. 5. Assume that, in FIG. 5, for example, ON durations of 50 ms repeat in the DRX cycle.

Figure 5:
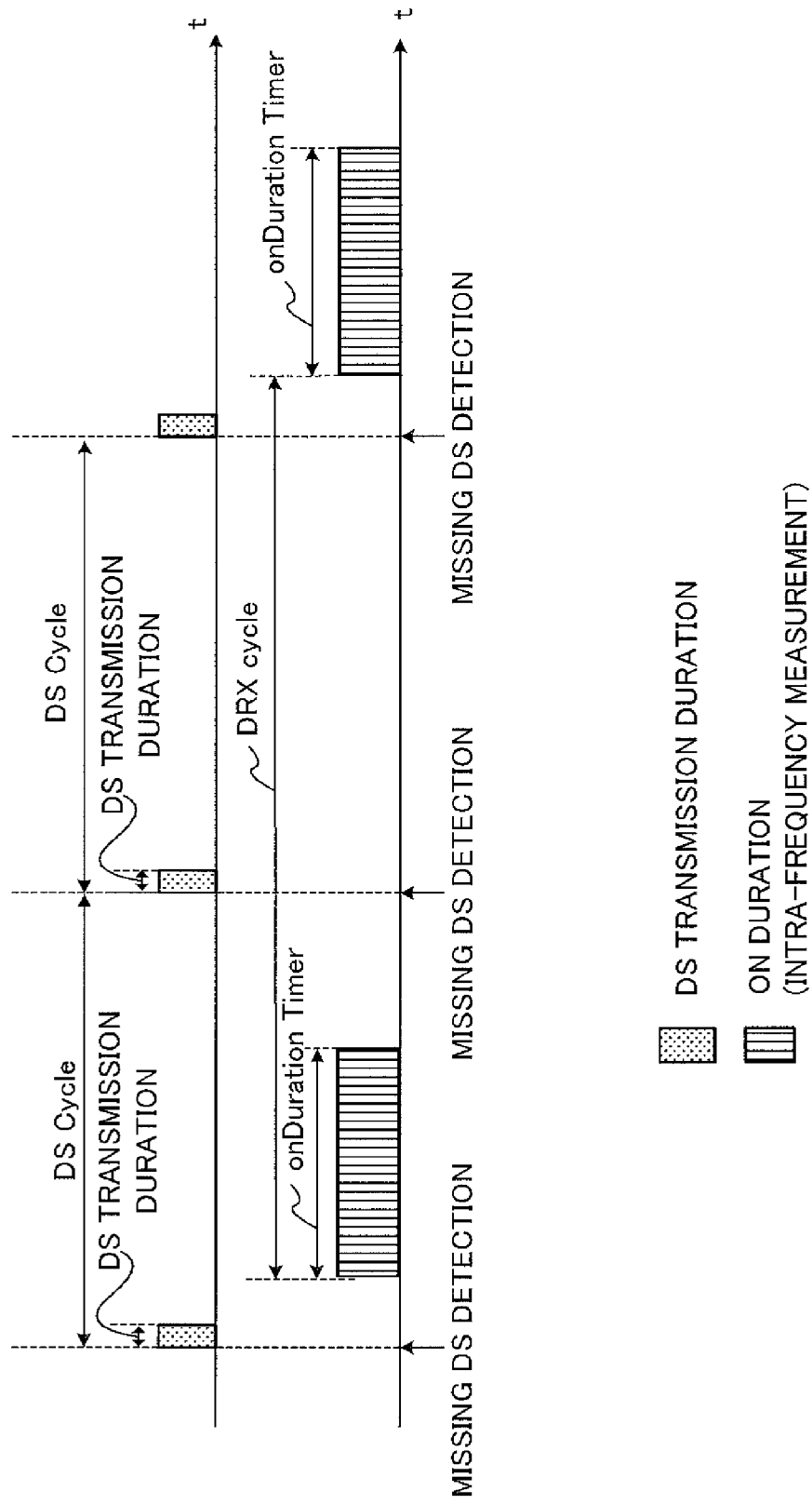
FIG. 5 is a diagram to explain frequency measurements using discovery signals.

Also, in FIG. 5, assume that the DS transmission duration is 1 ms, and the DS cycle is 100 ms. Here, the DS transmission duration is the discovery signal transmission duration, and lasts a predetermined length of time. Also, the DS cycle is the discovery signal transmission cycle.

As shown in FIG. 5, the discovery signal is not transmitted as frequently as the CRS, PSS and SSS of FIG. 4. Consequently, there is a threat that the DS transmission durations and ON durations do not overlap and therefore small cells cannot be detected. Otherwise, the situation might occur where it takes a long time before the DS transmission durations and the ON durations overlap, and therefore timely detection of small cells is not possible.

Figure 6:
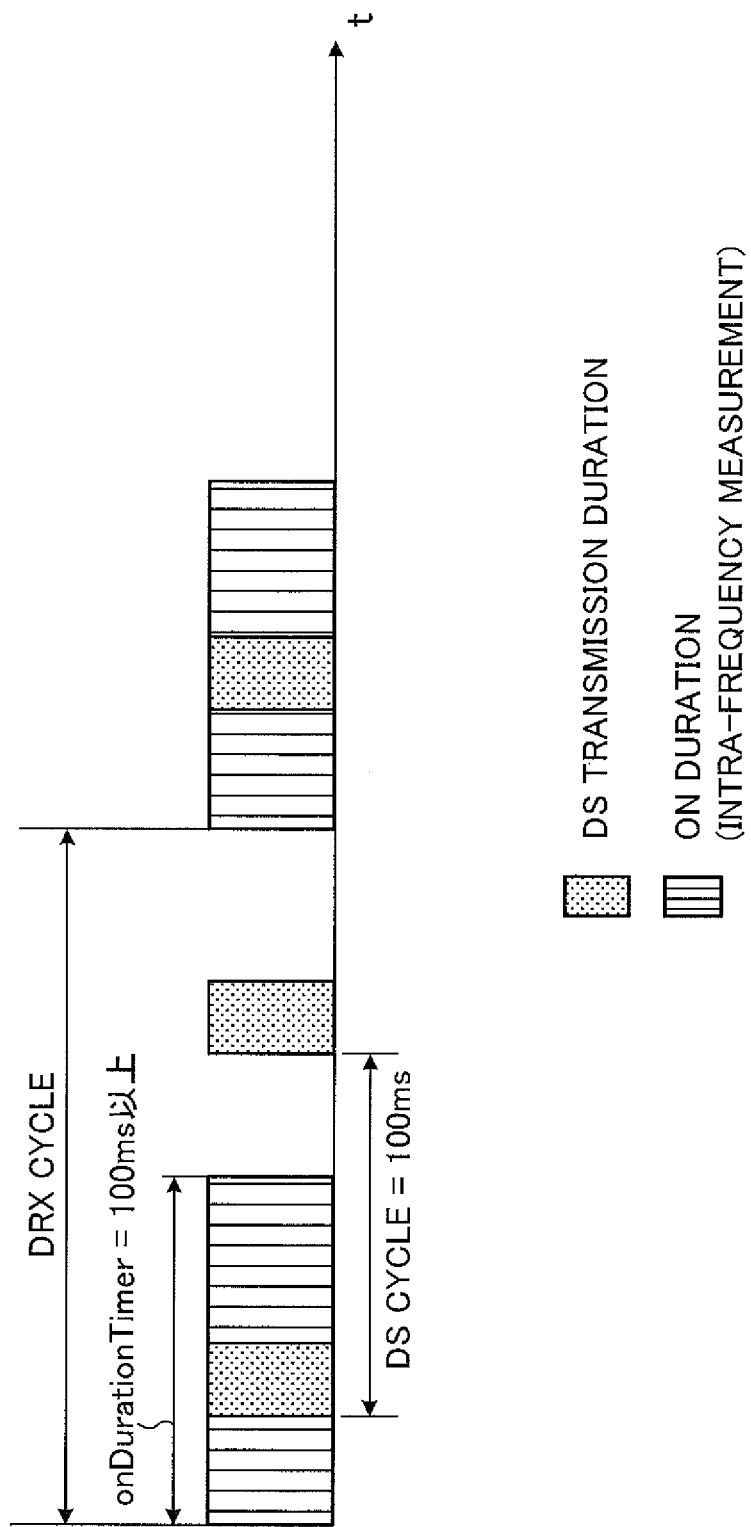
FIG. 6 is a diagram to explain frequency measurements using discovery signals.

Here, if the ON durations are configured longer than the DS cycle as shown in FIG. 6 (if the on-duration timer is configured 100 ms or longer), the DS transmission durations and the ON durations overlap, so that timely detection of small cells is possible. However, when the ON durations are configured longer than the DS cycle as shown in FIG. 6, if the DRX cycle is fixed, the power consumption in the user terminal increases as much as the ON durations expand.

As described above, when the discovery signal is used as a small cell detection/measurement signal, there is a problem that configuring the ON durations long so that the DS transmission durations and the ON durations overlap results in increased power consumption in user terminals. So, the present inventors have conceived of enabling small cell detection while preventing the increase of power consumption in user terminals by configuring the detection durations for discovery signal detection (hereinafter referred to as "DS detection durations") to overlap at least one of DS transmission durations that repeat in the DS cycle.

To be more specific, in intra-frequency measurements according to the present invention, a user terminal receives discovery signal (DS) configuration information (transmission configuration information). The DS configuration information is information related to the configuration of the discovery signal, and includes at least one of the above DS cycle (the detection/measurement signal transmission cycle), the above DS transmission duration (the detection/measurement signal transmission duration), and the DS start offset (the start offset of the detection/measurement signal transmission duration). Note that the DS start offset is the start offset from the top of a radio frame to the beginning of a DS transmission duration, and represents the time to transmit the discovery signal.

Also, in intra-frequency measurements according to the present invention, a user terminal receives DRX information (discontinuous reception information). The DRX information includes at least one of the DRX cycle (discontinuous reception cycle), the on-duration timer and the DRX start offset. Note that the DRX cycle may include a short DRX cycle (drxShortCycle) and a long DRX cycle (drxLongCycle).

In intra-frequency measurements according to the present invention, a user terminal configures DS detection durations to overlap at least one of DS transmission durations, which repeat in the DS cycle, based on the DS configuration information and DRX information, Also, the user terminal receives the discovery signal in the DS detection durations configured, and measures the received quality of the discovery signal. The measurement result is reported to, for example, a macro base station, as a measurement report.

Here, the DS detection durations may be the ON durations that repeat in the DRX cycle (the first example to be described later), or may be one or more durations to switch on the receiving circuit, apart from the ON durations that repeat in the DRX cycle (the second example and third example to be described later).

Communication control methods according to the present embodiment will be described in detail. Note that the communication control methods according to the present embodiment are implemented in a radio communication system where small cells are placed within a macro cell. Here, the macro cell and the small cells may use the same frequency band, or may use different frequency bands. A case will be described below as an example where the macro cell uses the frequency F1 and the small cells use the frequency F2.

Also, with the communication control methods according to the present embodiment, the DS configuration information and DRX information may be notified from the macro base station, may be notified from the small base stations, or may be notified from both. For example, when simultaneous connection (carrier aggregation) is used between the macro cell to use the frequency F1 and the small cell to use the frequency F2, or when the same frequency band is used between the macro cell and the small cells, the DS configuration information and DRX information may be notified from the macro base station. Also, when a user terminal is connected to a specific small cell (small base station), the DS configuration information and DRX information may be notified from the connecting small base station. A case will be described below as an example where the DS configuration information and DRX information are notified from the macro base station.

First Example

A communication control method according to a first example will be described with reference to FIG. 7. With the communication control method according to the first example, a user terminal configures ON durations, which repeat in the DRX cycle, to overlap at least one of DS transmission durations that repeat in the DS cycle. That is, with the communication control method according to the first example, the above DS detection durations are the same as the ON durations that repeat in the DRX cycle.

To be more specific, with the communication control method according to the first example, the DRX cycle is configured k times the DS cycle (where k≥1), and notified to the user terminal with the DS start offset. The user terminal configures the above ON durations at times that are determined based on the DRX cycle and the DS start offset.

For example, the user terminal 1 may configure the above ON durations at times where following equation 1 is fulfilled:

$$[(SFN*10)+\text{subframe number}]\,\text{modulo}\,(DRX\ cycle) = DS\ \text{start offset} \qquad (\text{Equation 1})$$

Note that, in equation 1, SFN (System Frame Number) is the number of a radio frame that is formed with ten subframes. Also, the ON durations may be configured by starting the on-duration timer when the above equation 1 is fulfilled. Here, the on-duration timer is the timer to indicate the time the ON durations last, and may show the same length of time as the DS transmission durations.

Figure 7:
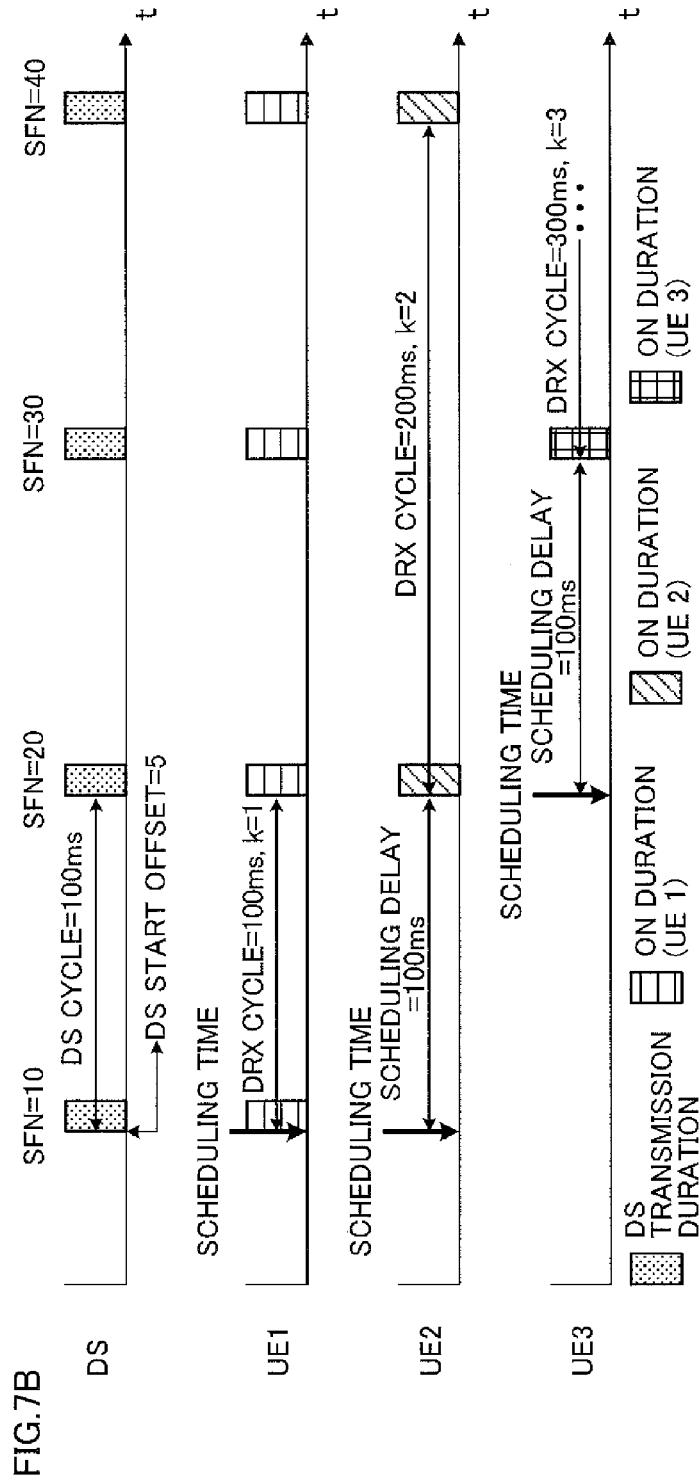
FIG. 7 provides diagram to explain a communication control method according to a first example of the present embodiment.

FIG. 7 provides diagrams to explain the communication control method according to the first example. In FIG. 7A, the DS cycle is 100 ms (ten radio frames), and the DS start offset is 5. In this case, as shown in FIG. 7B, a DS transmission duration is configured, for example, in the subframe of subframe number 5 in SFN=10, 20, 30 and 40.

Also, in FIG. 7A, the DRX cycle of the user terminal 1 is configured to be 100 ms, which is one times the DS cycle. Also, the DRX cycle of the user terminal 2 is configured to be 200 ms, which is twice the DS cycle. Also, the DRX cycle of the user terminal 3 is configured to be 300 ms, which is three times the DS cycle.

In FIG. 7B, in accordance with the above equation 1, the user terminal 1 starts the on-duration timer in each subframe of subframe number 5 in SFN=10, 20, 30 and 40, and configures ON durations. In this case, the ON durations that repeat in the DRX cycle overlap the times where each DS transmission duration starts, as shown in FIG. 7B. Consequently, when the user terminal 1 is scheduled in the radio frame of SFN=10, it is possible to detect the discovery signal, without delay, in the DS transmission durations in the radio frame of SFN=10. Note that although, in FIG. 7B, the configuration value of the on-duration timer is the same as that of the DS transmission durations (for example, 1 ms), the configuration value on the on-duration timer (for example, 50 ms and so on), does not have to be the same as that of the DS transmission durations.

Also, in accordance with the above equation 1, the user terminal 2 starts the on-duration timer in each subframe of subframe number 5 in SFN=20 and 40, and configures ON durations. In this case, even when the user terminal 2 is scheduled in the radio frame of SFN=10, the user terminal 2 can receive downlink control signals only in the DS transmission duration in the radio frame of SFN=20, and therefore more user terminals configure ON durations at the same time and the control channel capacity runs short. Consequently, a 100 ms scheduling delay is produced.

Also, in accordance with the above equation 1, the user terminal 3 starts the on-duration timer in each subframe of subframe number 5 in SFN=30, and configures ON durations. In this case, even when the user terminal 3 is scheduled in the radio frame of SFN=20, the user terminal 2 can receive downlink control signals only in the DS transmission duration in the radio frame of SFN=30. Consequently, a 100 ms scheduling delay is produced.

With the communication control method according to the first example, ON durations that repeat in the DRX cycle are configured to overlap at least one of DS transmission durations that repeat in the DS cycle. Consequently, as shown in FIG. 6, it is possible to make the ON durations and the DS transmission cycle overlap, without configuring the ON durations equal to or longer than the DS cycle. As a result of this, it is possible to detect small cells more reliably, without increasing power consumption in user terminals.

Second Example

Figure 9:
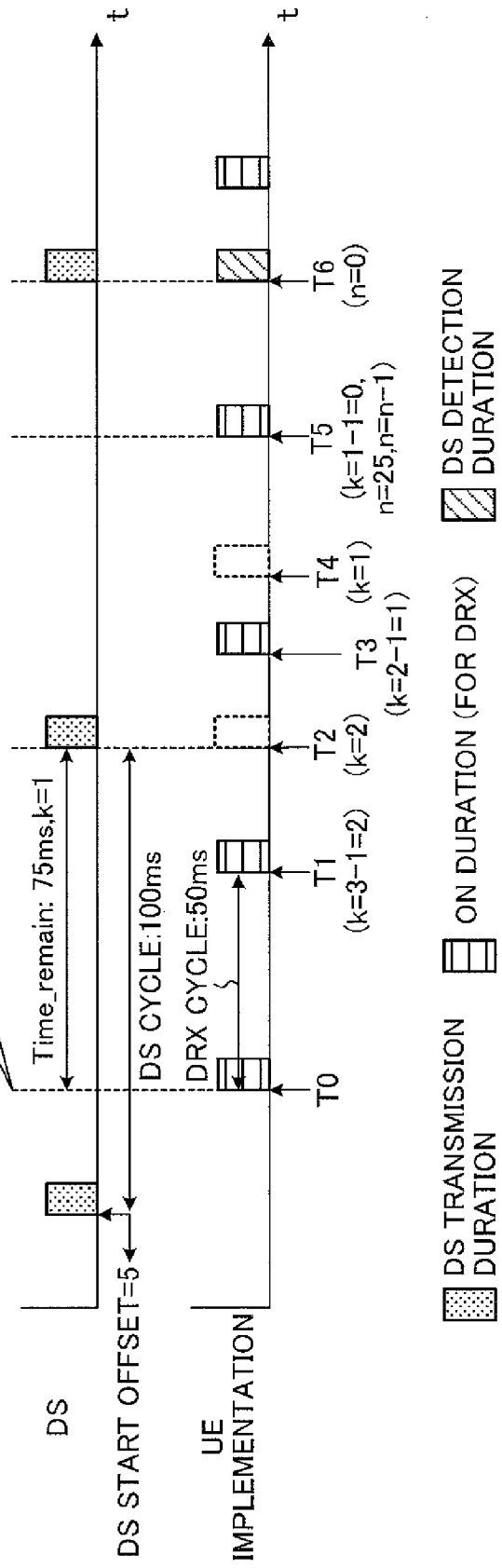
FIG. 9 provides diagram to explain the communication control method according to the second example of the present embodiment.

A communication control method according to a second example will be described with reference to FIGS. 8 to 10. With the communication control method according to the second example, a user terminal configures DS detection durations, apart from the ON durations that repeat in the DRX cycle, to overlap at least one of DS transmission durations that repeat in the DS cycle. That is, with the communication control method according to the second example, the above DS detection durations are configured apart from the ON durations that repeat in the DRX cycle.

To be more specific, with the communication control method according to the second example, at least the DS cycle, the DS start offset and the DRX cycle are notified to the user terminal. The user terminal configures DS detection durations at times that are determined based on the DS cycle, the DS start offset, the DRX cycle and the user terminal's remaining battery charge. In the DS detection durations, the user terminal switches on the receiving circuit ("wakes up") in order to detect the discovery signal.

For example, the user terminal may configure the above DS detection durations at times that are determined based on the following equation 2:

$$\text{Time\_remain}+m*\text{DS cycle}=k*\text{DRX cycle}+n \quad \text{(Equation 2)}$$

Note that, in equation 2, Time_remain is the time remaining before and until the next DS transmission duration, and may be determined based on the DS start offset. Also, m is a predetermined coefficient that is determined based on the user terminal's remaining battery charge. Also, k and n are predetermined coefficients that are calculated in the user terminal.

The predetermined coefficient m will be described with reference to FIG. 8. As shown in FIG. 8, the predetermined coefficient m indicates every how many DS cycles one DS detection duration is configured. For example, in FIG. 8, when the user terminal's remaining battery charge (P_remain) is 80% or above and 100% or below, m is configured to "0." In this case, DS detection durations are configured on a per DS cycle basis. Also, when the user terminal's remaining battery charge is 50% or above and below 80%, m is configured to "1." In this case, one DS detection duration is configured every two DS cycles.

Also, when the user terminal's remaining battery charge is 20% or above and below 50%, m is configured to "2." In this case, one DS detection duration is configured every three DS cycles. Also, when the user terminal's remaining battery charge is below 20%, m is configured to "6." In this case, one DS detection duration is configured every seven DS cycles.

In this way, the predetermined coefficient m is configured so that the DS detection duration cycle becomes longer as the user terminal's remaining battery charge decreases. Note that the configuration values of m shown in FIG. 8 are only an examples, and these are by no means limiting. Also, the threshold for the remaining battery charge is not limited to those shown in FIG. 8 either.

Next, the communication control method according to the second example will be described in detail with reference to FIGS. 9 and 10. A case will be described below as an example where, as shown in FIG. 9A, the DS cycle is 100 ms, the DS start offset is 5, and the DRX cycle is 50 ins. Also, assume that the remaining battery charge of a user terminal is 50% or above and below 80%, and m=1.

Figure 10:
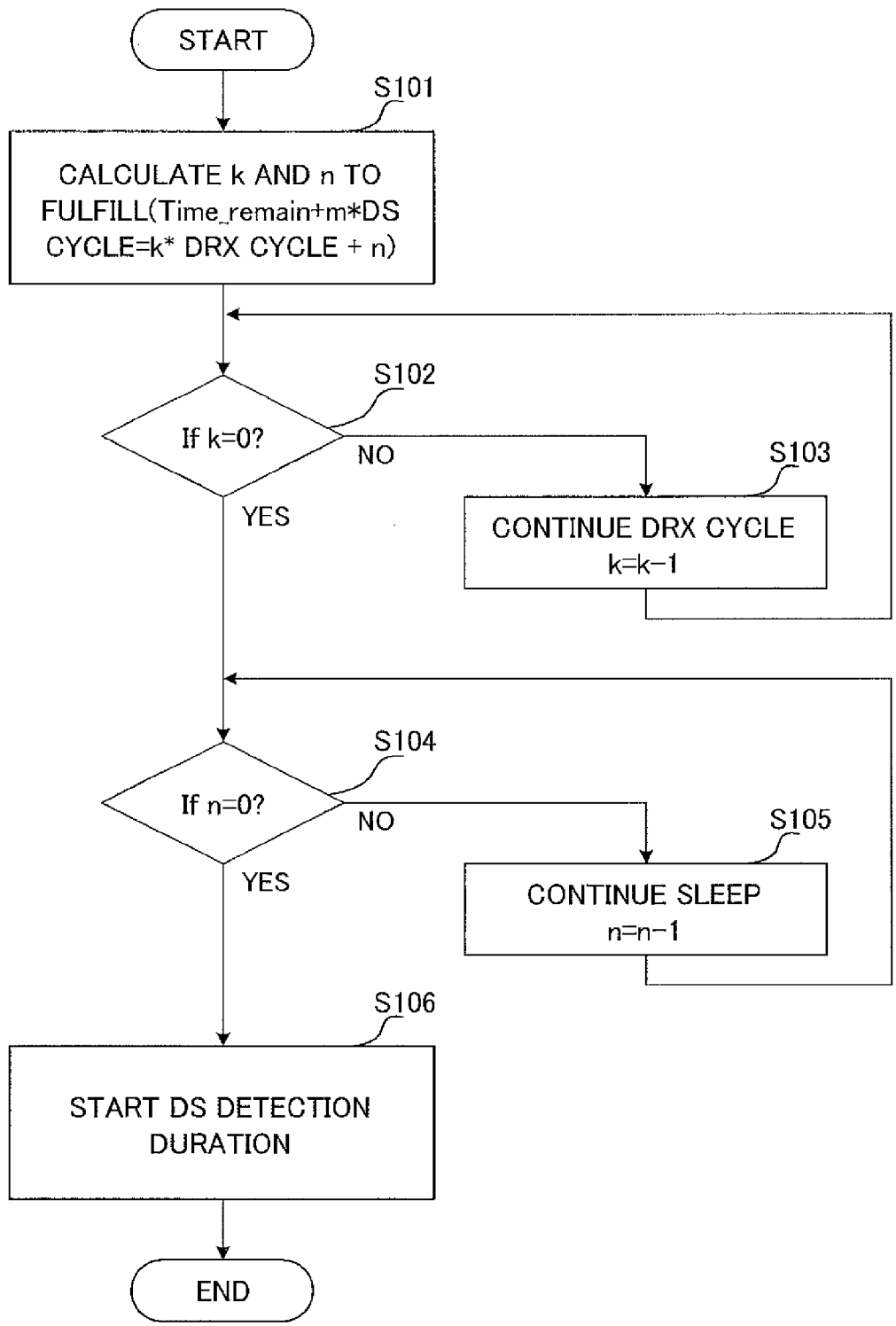
FIG. 10 is a flowchart to show the communication control method according to the second example of the present embodiment.

Also, assume that the flowchart shown in FIG. 10 starts at time T0 in FIG. 9B. Assume that, at time T0, the time remaining before and until the next DS transmission duration (Time_remain) is 75 ms.

As shown in FIG. 10, the user terminal calculates k and n that fulfill above equation 2 (step S101). For example, in FIG. 9B, equation 2 is represented as 75+1*100=k*50+n. In this case, k=3 and n=25 fulfill the equation 2.

The user terminal decides whether or not k=0 holds (step S102). When k=0 does not hold (step S102: NO), the user terminal continues the DRX cycle, and subtracts 1 from k every time the DRX cycle expires (that is, k=k−1) (step S103). For example, k=3 holds at time T0 in FIG. 9B, so that the user terminal continues the DRX cycle and makes k=3−1=2 at time T1, and returns to step S102. Up to times T2, T3, T4 and T5, steps S102 and S103 are repeated.

When k=0 holds (step S102: YES), the user terminal decides whether or not n=0 holds (step S104). When n=0 does not hold (step S104: NO), the user terminal continues sleeping, and subtracts 1 from n every subframe (that is, n=n−1) (step S105). For example, in FIG. 9B, k=0 and n=25 hold at time T5, so that the user terminal continues sleeping and subtracts 1 from n every subframe.

When n=0 holds (step S104: YES), the user terminal starts a DS detection duration (step S106). For example, in FIG. 9B, n=0 holds at time T6, so that the user terminal starts a DS detection duration.

With the communication control method according to the second example, the user terminal configures DS detection durations that overlap the DS transmission durations, apart from the ON durations that repeat in the DRX cycle. Consequently, as shown in FIG. 6, it is possible to make the ON durations and the DS transmission cycle overlap, without configuring the ON durations equal to or longer than the DS cycle. As a result of this, it is possible to detect small cells more reliably, without increasing power consumption in user terminals.

Also, with the communication control method according to the second example, it is possible to prevent the situation where many user terminals configure ON durations at the same time. As a result of this, in comparison with the communication control method according to the first example, it is possible to make the load on the control channel scatter, and reduce the scheduling delay.

Third Example

A communication control method according to a third example will be described with reference to FIG. 11. With the communication control method according to the third example, a user terminal configures DS detection durations, apart from the ON durations that repeat in the DRX cycle, to overlap at least one of DS transmission durations that repeat in the DS cycle. That is, with the communication control method according to the third example, the above DS detection durations are configured apart from the ON durations that repeat in the DRX cycle.

To be more specific, with the communication control method according to the third example, at least the DS cycle, the DS start offset and the number of DS cycles, k, per DS cycle are notified to a user terminal. The user terminal configures DS detection durations at times that are determined based on the above number k, DS cycle and DS start offset. In the DS detection durations, the user terminal switch on the receiving circuit ("wakes up") in order to detect the discovery signal.

For example, the user terminal may configure the above DS detection durations at times that are determined based on the following equation 3:

$$[(SFN*10)+\text{subframe number}] \bmod (k*DS\ cycle) = DS\ \text{start offset} \quad \text{(Equation 3)}$$

Note that, in equation 3, SFN is the radio frame number, and k is the number of DS cycles per DS detection duration.

A communication control method according to a third example will be described in detail with reference to FIG. 11. A case will be described below as an example where, as shown in FIG. 11A, the DS cycle is 100 ms, the DS start offset is 5, and the DRX cycle is 50 ms. Note that these DRX cycle, DS start offset and DRX cycle are notified to user terminals.

Also, assume that the number of DS cycles k per DS detection duration is 2. The number k is determined in the macro base station. The number k is notified to the user terminal through, for example, higher layer signaling such as RRC signaling.

As shown in FIG. 11B, if the configuration values of FIG. 11A are used, the equation 3 is fulfilled in the subframe of subframe number 5 in SFN=0 and 20. Consequently, the user terminal configures DS detection durations in the subframe of subframe number 5 in SFN=0 and 20.

With the communication control method according to the third example, the user terminal configures DS detection durations to overlap the DS transmission durations, apart from the ON durations that repeat in the DRX cycle. Consequently, as shown in FIG. 6, it is possible to make the ON durations and the DS transmission cycle overlap, without configuring the ON durations equal to or longer than the DS cycle. As a result of this, it is possible to detect small cells more reliably, without increasing power consumption in user terminals.

Also, with the communication control method according to the third example, the times of the DS detection durations are configured based on the number k that is determined in a device on the network side, and the DRX ON durations are configured apart from the DS detection durations. Consequently, it is possible to prevent the situation where many user terminals configure ON durations at the same time. As a result of this, in comparison with the communication control method according to the first example, it is possible to make the load on the control channel scatter, and reduce the scheduling delay.

Advantages

Advantages of the communication control methods according to the first to third examples of the present invention will be described with reference to FIGS. 12 and 13. Assume that, in FIGS. 12 and 13, the option "Baseline" configures the ON durations that repeat in the DRX cycle to 100 ms or greater, as shown in FIG. 6. Also, assume that the options 1, 2 and 3 use the communication control methods according to the first, second and third examples, respectively.

Also, as shown in FIG. 12A, when a predetermined coefficient m and the number of DS cycles k per DS detection duration are configured based on the DRX cycle, the on-duration timer and the user terminal's remaining battery charge, as shown in FIG. 12B, the communication control methods according to the first to third examples (options 1 to 3) can make the active time of the user terminal short, compared to the case shown in FIG. 6 (the option "Baseline"). Consequently, as shown in FIG. 13, the effect of reducing power consumption in user terminals improves with the communication control methods according to the first to third examples.

Also, as shown in FIGS. 12C and 13, with the communication control methods according to the second and third examples, it is possible to prevent producing scheduling delay. Also, as shown in FIG. 13, with the communication control methods according to the second and third examples, it is possible to improve the opportunities to detect discovery signals in user terminals.

(Structure of Radio Communication System)

Now, a radio communication system according to the present embodiment will be described below in detail. In this radio communication system, the above-described radio communication control methods according to the first to third examples are employed.

Figure 14:
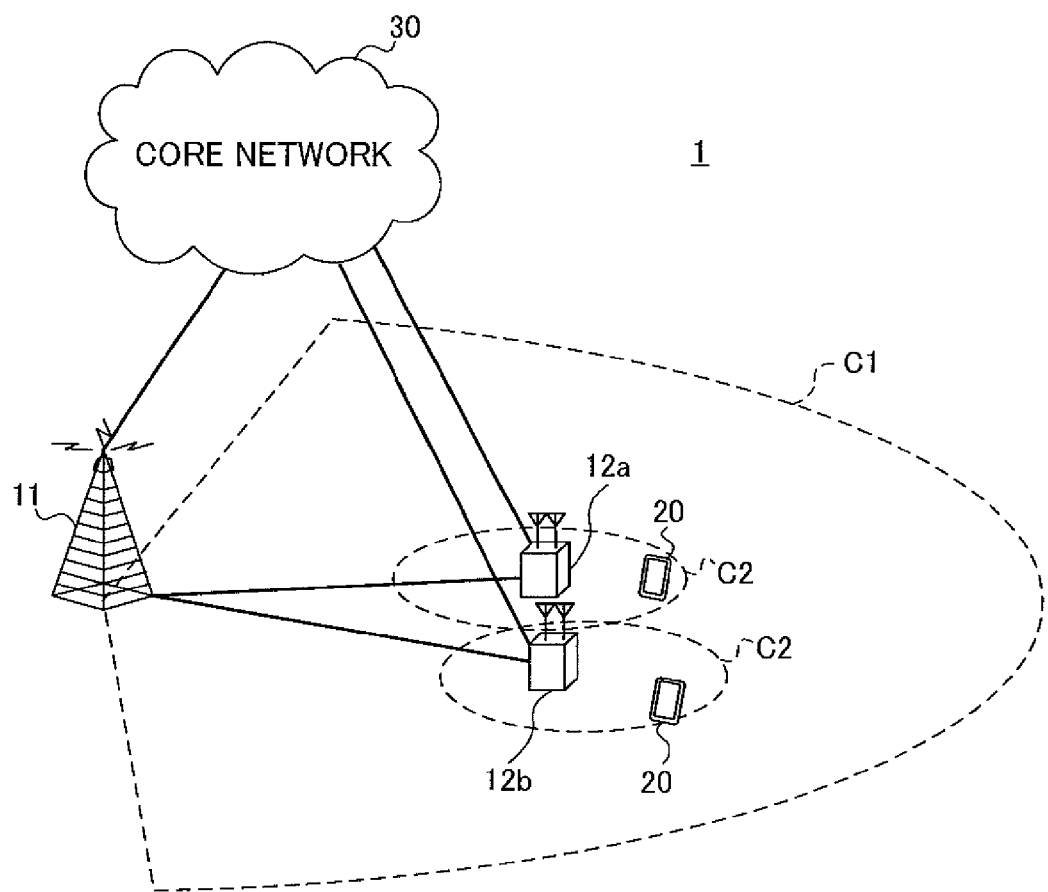
FIG. 14 is a schematic diagram to show an example of a radio communication system according to the present embodiment.

FIG. 14 is a schematic configuration diagram of a radio communication system according to the present embodiment. As shown in FIG. 14, the radio communication system 1 includes a macro base station 11, which forms a macro cell C1, and small base stations 12a and 12b, which are placed in the macro cell C1 and which form small cells C2 that are narrower than the macro cell C1. Also, user terminals 20 are placed in the macro cell C1 and each small cell C2. Note that the numbers of macro cells C1 (macro base stations 11), small cells C2 (small base stations 12) and user terminals 20 are not limited to those shown in FIG. 11.

Also, in the macro cell C1 and in each small cell C2, user terminals 20 are placed. The user terminals 20 are configured to be able to perform radio communication with the macro base station 11 and/or the small base stations 12.

Between the user terminals 20 and the macro base station 11, communication is carried out using a frequency F1 (carrier) of a relatively low frequency band (for example, 2 GHz). On the other hand, between the user terminals 20 and the small base stations 12, a frequency (carrier) of a relatively high frequency band (for example, 3.5 GHz) is used. Note that the frequency bands to use in the macro base station 11 and the small base stations 12 are by no means limited to these, and the same frequency band may be used as well.

Also, the macro base station 11 and each small base station 12 may be connected via a channel of relatively low speed such as the X2 interface (non-ideal backhaul), may be connected via a channel of relatively high speed (low delay) such as optical fiber (ideal backhaul), or may be connected via radio. Also, the small base stations 12 may be connected via a channel of relatively low speed such as the X2 interface (non-ideal backhaul), may be connected via a channel of relatively high speed such as optical fiber (ideal backhaul), or may be connected via radio.

The macro base station 11 and the small base stations 12 are each connected with a core network 30. In the core network 30, core network devices such as an MME (Mobility Management Entity), an S-GW (Serving-GateWay), a P-GW (Packet-GateWay) and so on are provided.

Also, the macro base station 11 is a radio base station having a relatively wide coverage, and may be referred to as an "eNodeB," a "macro base station," an "aggregation node," a "transmission point," a "transmitting/receiving point" and so on. The small base stations 12 are radio base stations that have local coverages, and may be referred to as "small base stations," "pica base stations," "femto base stations," "HeNBs (Home eNodeBs)," "RRHs (Remote Radio Heads)," "micro base stations," "transmission points," "transmitting/receiving points" and so on.

Also, if no distinction is made between the macro base station 11 and the small base stations 12, these will be collectively referred to as the "radio base station 10." The user terminals 20 are terminals to support various communication schemes such as LTE, LTE-A and so on, and may include both mobile communication terminals and fixed communication terminals.

Also, in the radio communication system 1, a physical downlink shared channel (PDSCH: Physical Downlink Shared Channel), which is used by each user terminal 20 on a shared basis, physical downlink control channels (PDCCH: Physical Downlink Control Channel, EPDCCH: Enhanced Physical Downlink Control Channel), a physical broadcast channel (PBCH) and so on are used as downlink physical channels. User data and higher layer control information are transmitted by the PDSCH. Downlink control information (DCI) is transmitted by the PDCCH and the EPDCCH.

Also, in the radio communication system 1, a physical uplink shared channel (PUSCH: Physical Uplink Shared Channel), which is used by each user terminal 20 on a shared basis, a physical uplink control channel (PUCCH: Physical Uplink Control Channel) and so on are used as uplink physical channels. User data and higher layer control information are transmitted by the PUSCH. Also, downlink radio quality information (CQI: Channel Quality Indicator), delivery acknowledgment information (ACKs/NACKs) and so on are transmitted by the PUCCH.

Figure 15:
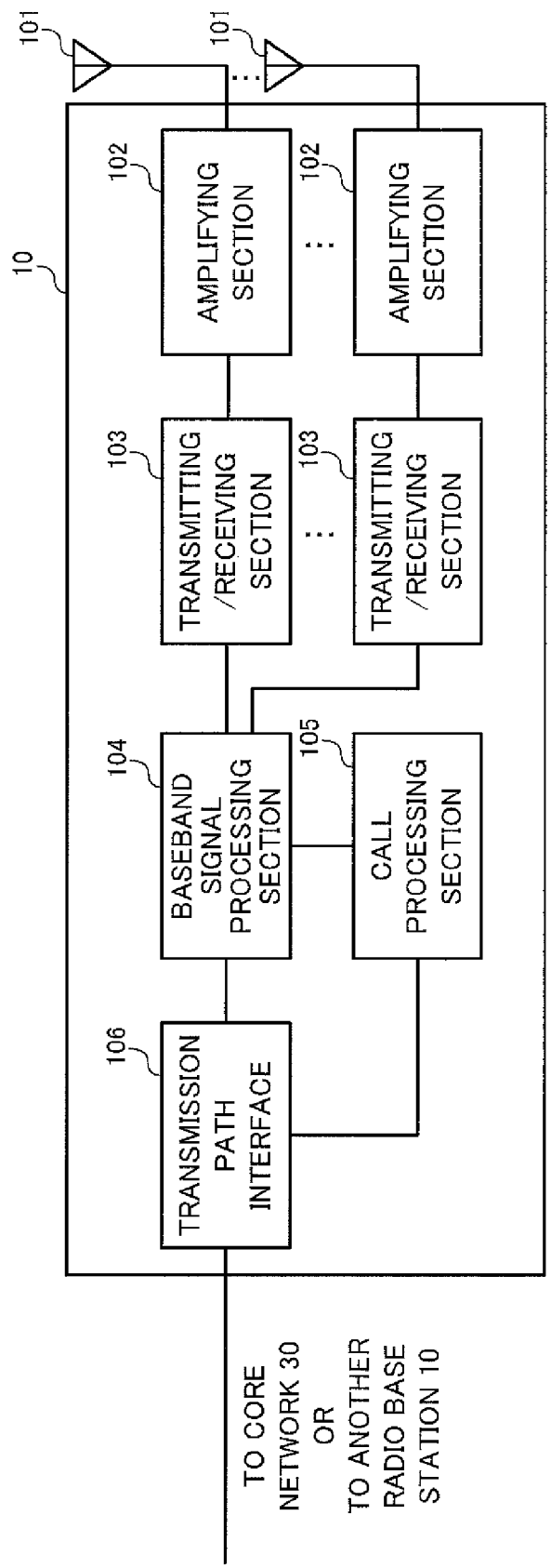
FIG. 15 is a diagram to show an overall structure of a radio base station 10 according to the present embodiment.

Now, an overall structure of a radio base station 10 (which may be either a macro base station 11 or a small base station 12) and a user terminal 20 will be described with reference to FIGS. 15 and 16. FIG. 15 is a diagram to show an overall structure of a radio base station 10 according to the present embodiment.

As shown in FIG. 15, the radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminal 20 on the downlink is input from the S-GW provided in the core network 30, into the baseband signal processing section 104, via the transmission path interface 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control signals (including reference signals, synchronization signals, broadcast signals, etc.) are also subjected to transmission processes such as channel coding and an inverse fast Fourier transform, and are transferred to each transmitting/receiving section 103.

Each transmitting/receiving section 103 converts the downlink signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

Note that each transmitting/receiving section 103 in a small base station 12 may transmit the detection/measurement signals (for example, the discovery signal and so on). Also, each transmitting/receiving section 103 in a macro base station 11 or a small base station 12 may transmit higher layer control information (for example, the above-described DS configuration information, DRX information, the number of DS cycles k per DS detection duration). In this way, each transmitting/receiving section 103 constitutes the transmission section of the present invention.

On the other hand, as for uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is transferred to the core network 30 via the transmission path interface 106. The call processing section 105 performs call processing such as setting up and releasing communication channels, manages the state of the radio base station 10 and manages the radio resources.

Figure 16:
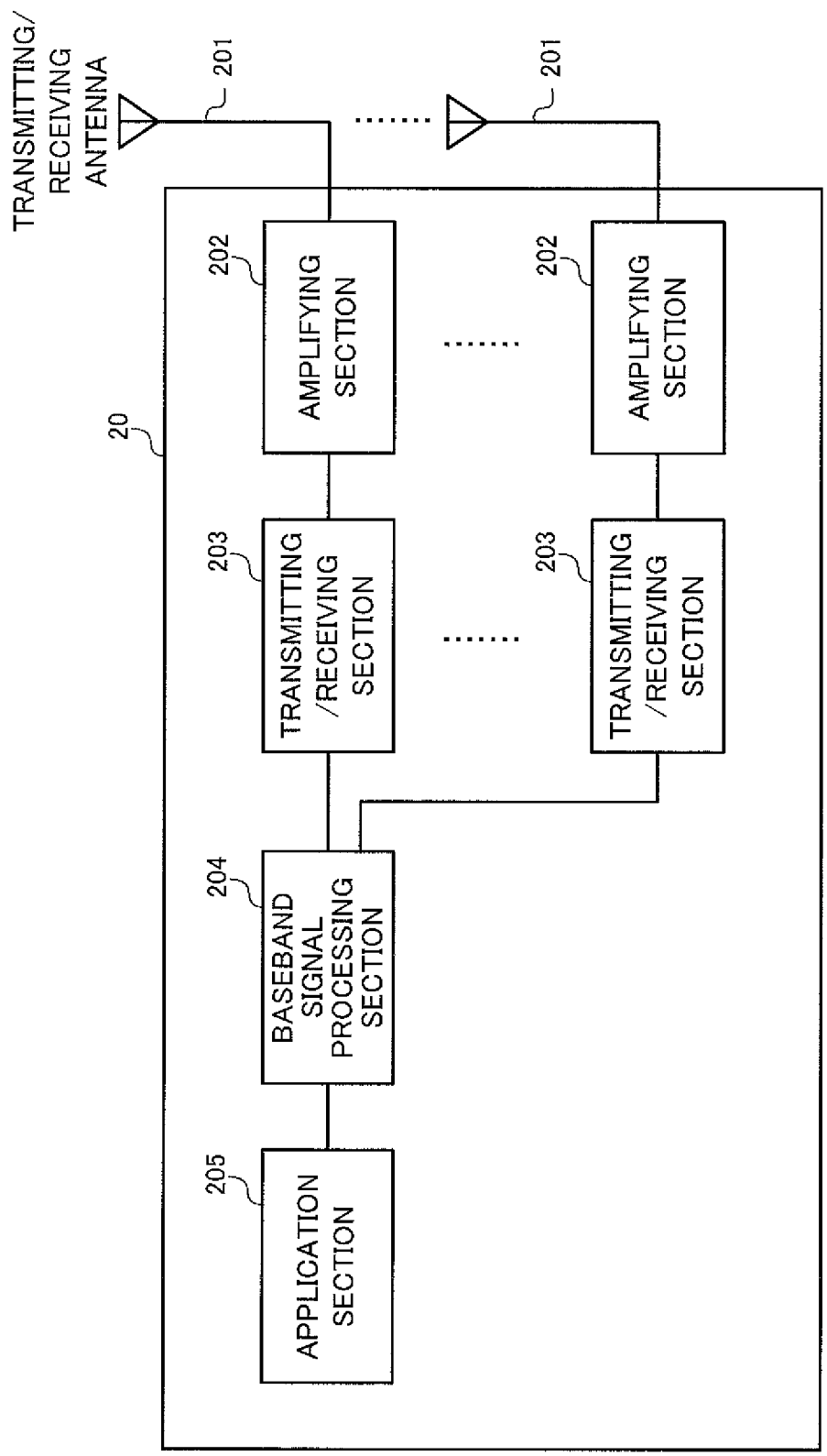
FIG. 16 is a diagram to explain an overall structure of a user terminal according to the present embodiment.

FIG. 16 is a diagram to show an overall structure of a user terminal 20 according to the present embodiment. The user terminal 20 has a plurality of transmitting/receiving antennas 201 for MIMO transmission, amplifying sections 202, transmitting/receiving sections 203, a baseband signal processing section 204 and an application section 205. Note that the user terminal 20 switches between the frequencies F1 and F2 for reception, by means of one receiving circuit (RF circuit).

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data that is included in the downlink signals is transferred to the application section 205. The application section 205 performs processes related to higher layers above the physical layer and the MAC layer. Furthermore, the broadcast information in the downlink data is also transferred to the application section 205.

Note that the transmitting/receiving sections 203 may receive the detection/measurement signals (for example, the discovery signals and so on) from the small base stations 12. Also, the transmitting/receiving sections 203 may receive higher layer control information (for example, the above-described DS configuration information and DRX information) from the macro base station 11. In this way, the transmitting/receiving sections 203 constitute the receiving section of the present invention.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process and so on, and transfers the result to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 17:
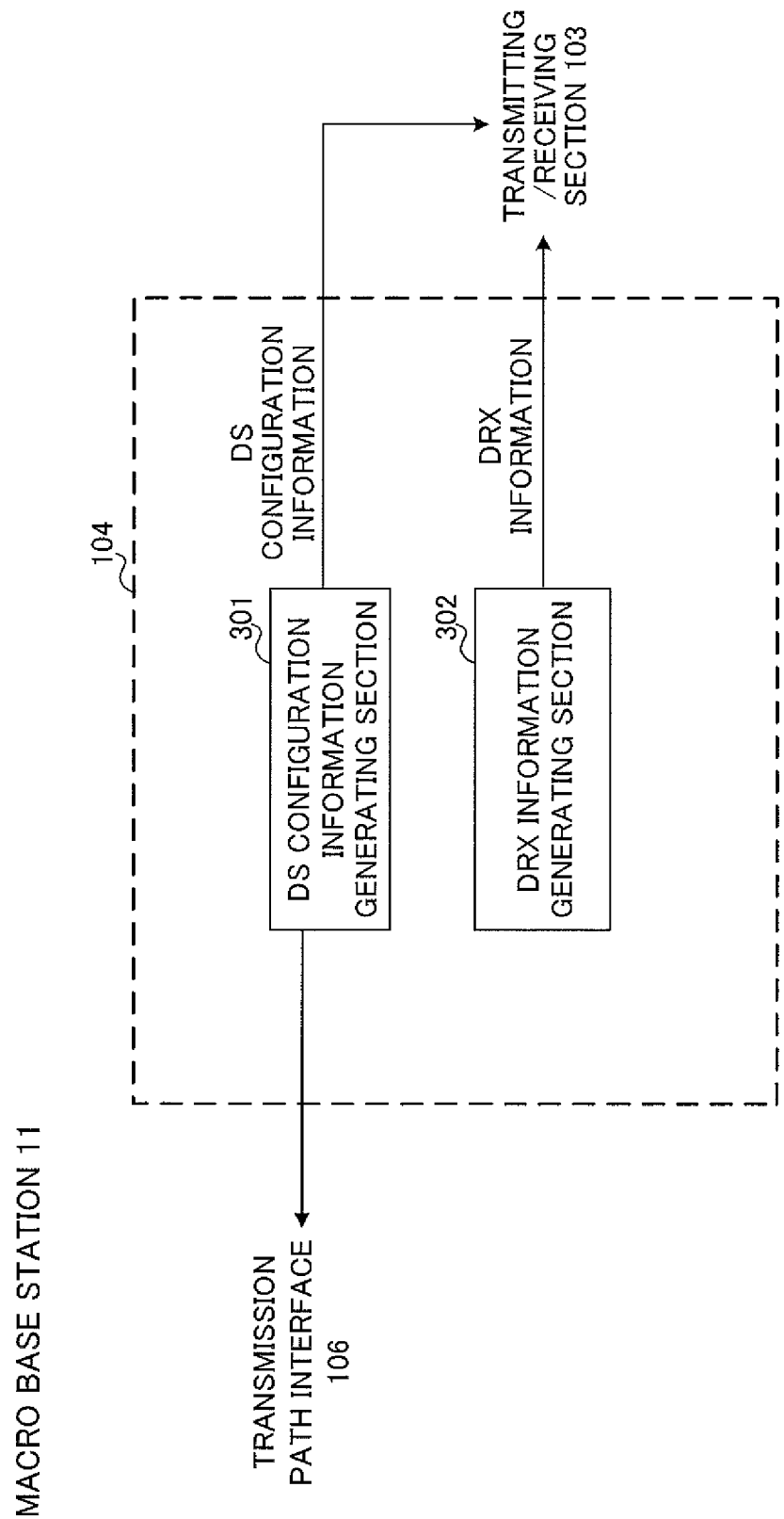
FIG. 17 is a diagram to show a functional structure of a macro base station according to the present embodiment.
Figure 18:
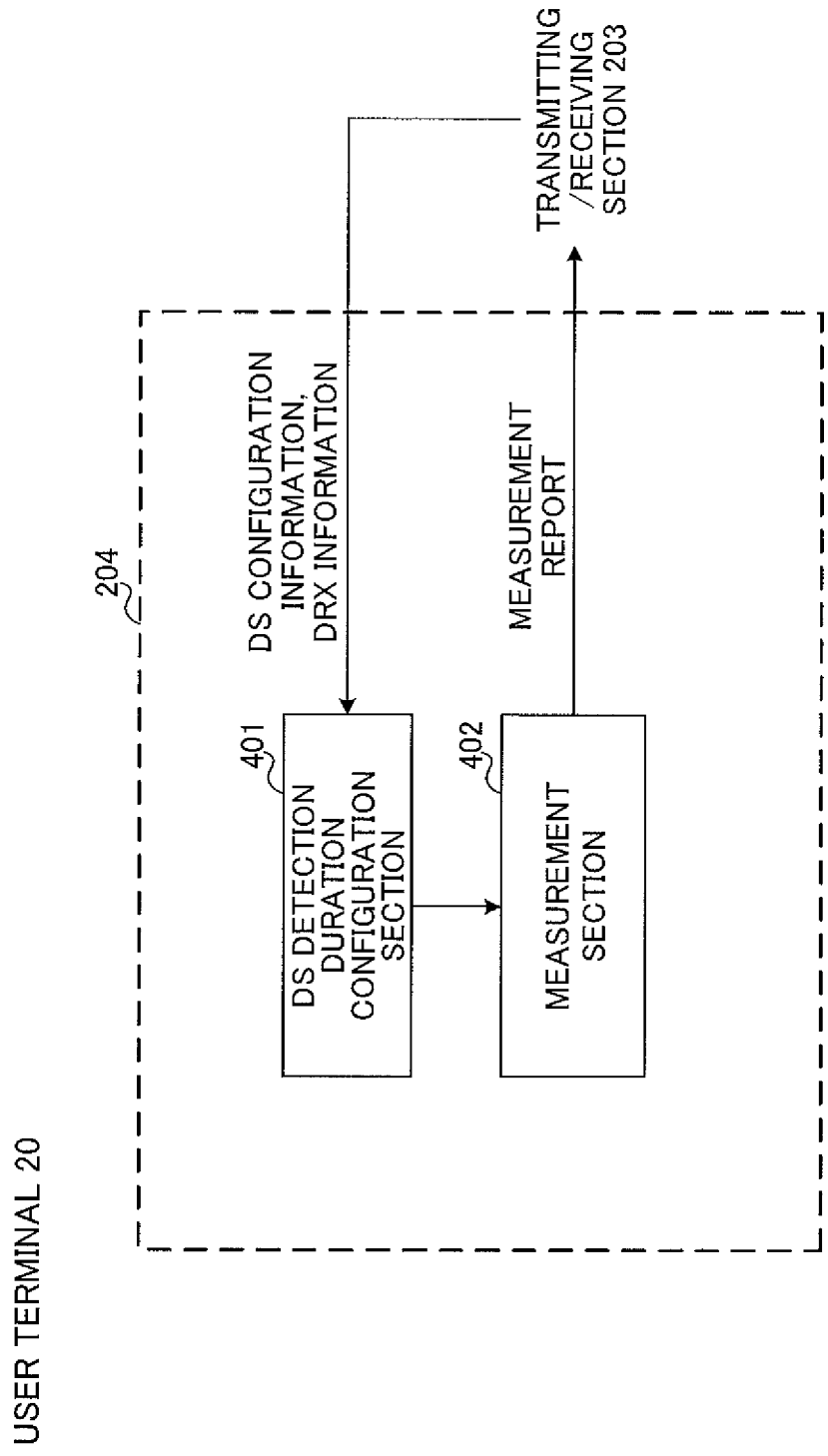
FIG. 18 is a diagram to show a functional structure of a user terminal according to the present embodiment.

Next, the functional structures of the macro base station 11 and the user terminal 20 will be described in detail with reference to FIG. 17 and FIG. 18. The functional structure of the macro base station 11 shown in FIG. 17 is primarily formed with the baseband signal processing section 104. Also, the functional structure of the user terminal 20 shown in FIG. 18 is primarily formed with the baseband signal processing section 204.

FIG. 17 is a diagram to show a functional structure of a macro base station 11 according to the present embodiment. As shown in FIG. 17, the macro base station 11 has a DS configuration information generating section 301 and a DRX information generating section 302. The DS configuration information generating section 301 and the DRX information generating section 302 constitute the generating section of the present invention.

The DS configuration information generating section 301 generates discovery signal (DS) configuration information (transmission configuration information). To be more specific, the DS configuration information generating section 301 determines at least one of the DS cycle, the DS transmission duration and the DS start offset. As noted earlier, the DS cycle is the transmission cycle of the discovery signal, the DS transmission duration is the transmission duration (the length of transmission time) of the discovery signal, and the DS start offset is the start offset from the top of a radio frame to the beginning of a DS transmission duration.

The DS configuration determining section 301 generates DS configuration information, which includes at least one of the DS cycle, DS transmission duration and DS start offset that is determined, and outputs this to the transmitting/receiving sections 103 (first to third examples). The DS configuration information is notified to the user terminal 20 through higher layer signaling such as RRC signaling. Also, the DS configuration information may be notified to the small base stations 12 serving under the macro base station 11 via the transmission path interface 106.

Also, the DS configuration information generating section 301 may determine the number of DS cycles k per DS detection duration, and output this to the transmitting/receiving section 103 (third example). This number k is notified to the user terminal 20 through higher layer signaling such as RRC signaling.

The DRX information generating section 302 generates DRX information (discontinuous reception information). To be more specific, the DRX information generating section 302 determines at least one of the DRX cycle, the on-duration timer and the DRX start offset. As noted earlier, the DRX cycle shows the cycle of repeating ON durations and OFF durations. The on-duration timer refers to the length of time of an ON duration. As shown in FIG. 4, the DRX start offset is the start offset from the top of a radio frame to the beginning of an ON duration, and represents the time of the ON duration.

Also, the DRX information generating section 302 generates DRX information including at least one of the DRX cycle, on-duration timer, and DRX start offset that is determined, and outputs this to the transmitting/receiving section 103 (first to third examples). Also, the DRX information is notified to the user terminal through higher layer signaling such as RRC signaling.

FIG. 18 is a diagram to show a functional structure of a user terminal 20 according to the present embodiment. As shown in FIG. 18, the user terminal 20 has a DS detection duration configuration section 401 and a measurement section 402. The DS detection duration configuration section 401 constitutes the configuration section of the present invention.

The DS detection duration configuration section 401 configures DS detection durations to overlap at least one DS transmission duration, based on the DS configuration information and the DRX information. Note that the DS detection durations may be the ON durations that repeat in the DRX cycle (first example), or may be durations to switch on the receiving circuit, apart from the ON durations (second and third examples). Also, the DS configuration information and DRX information are received in the transmitting/receiving sections 203 from the macro base station 11 or the small base stations 12, and input in the DS detection duration configuration section 401.

To be more specific, the DS detection duration configuration section 401 may configure ON durations, which repeat in the DRX cycle, as DS detection durations, at times that are determined based on the DRX cycle and the DS start offset (first example). In this case, the DRX cycle is configured to be k times the DS cycle (where k≥1). For example, the DS detection duration configuration section 401 may configure the above ON durations at times where the above equation 1 is fulfilled.

Also, the DS detection duration configuration section 401 may configure DS detection durations, apart from the ON durations that repeat in the DRX cycle, at times that are determined based on the DS start offset, the DS cycle, the DRX cycle and the remaining battery charge of the user terminal 20 (second example). For example, the DS detection duration configuration section 401 may configure DS detection durations at times that are determined based on the above equation 2.

Also, the DS detection duration configuration section 401 may configure DS detection durations, apart from the ON durations that repeat in the DRX cycle, at times that are determined based on the number of DS cycles k per DS detection duration, the DS cycle and the DS start offset (third example). For example, the DS detection duration configuration section 401 may configure DS detection durations at times where the above equation 3 is fulfilled. Note that the number k is received in the transmitting/receiving sections 203 from the macro base station 11, and input in the DS detection duration configuration section 401.

The measurement section 402 detects the small cells C2 by means of intra-frequency measurements in the DS detection durations configured in the DS detection duration configuration section 401. To be more specific, the measurement section 402 measures the received quality of the discovery signal transmitted from the small base stations 11 in the DS detection durations. As noted earlier, the received quality may be the RSRP, RSRQ, SINR, SNR and so on.

Also, the measurement section 402 may detect the small cells C2 by means of intra-frequency measurements in the ON durations that repeat in the DRX cycle. To be more specific, the measurement section 402 measures the received quality of the discovery signals that are transmitted from the small base stations 11 in the ON durations.

Also, the measurement section 402 outputs the measurement result to the transmitting/receiving section 203 as a measurement report. This measurement report is reported to the macro base station 11 through, for example, higher layer signaling such as RRC signaling.

With the radio communication system 1 according to the present embodiment, the DS detection durations in user terminals are configured so as to overlap at least one of DS transmission durations that repeat in the DS cycle. Consequently, as shown in FIG. 6, it is possible to make the ON durations and the DS transmission cycle overlap, without configuring the ON durations equal to or longer than the DS cycle. As a result of this, it is possible to detect small cells more reliably, without increasing power consumption in user terminals.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2013-160729, filed on Aug. 1, 2013, including the specification, drawings and abstract, is incorporated herein by reference in its entirety.

The invention claimed is:

1. A user terminal comprising:
a receiver that receives transmission configuration information indicating a transmission cycle of a discovery signal and discontinuous reception information indicating a discontinuous reception cycle in the user terminal; and
a processor that configures a detection duration used for cell detection and/or measurement, based on the transmission cycle and the discontinuous reception cycle, irrespective of an ON duration that repeats in the discontinuous reception cycle.

2. The user terminal according to claim 1, wherein
the transmission configuration information further indicates a start offset of a transmission duration of the discovery signal, and
the processor configures the transmission duration of the discovery signal at a time that is determined based on the transmission cycle and the start offset.

3. The user terminal according to claim 1, wherein
the discontinuous reception information further indicates a start offset of the ON duration, and the processor configures the ON duration at a time that is determined based on the discontinuous reception cycle and the start offset.

4. The user terminal according to claim 1, wherein
the receiver receives the transmission configuration information and the discontinuous reception information by higher layer signaling.

5. The user terminal according to claim 1, wherein the transmission cycle is longer than a transmission cycle of at least one of a PSS (Primary Synchronization Signal), an SSS (Secondary Synchronization Signal) and a CRS (Cell-specific Reference Signal).

6. The user terminal according to claim 1, wherein
the discovery signal includes a CSI-RS (Channel State Information-Reference Signal).

7. A radio base station comprising:
a processor that generates transmission configuration information indicating a transmission cycle of a discovery signal and discontinuous reception information indicating a discontinuous reception cycle in a user terminal; and
a transmitter that transmits the transmission configuration information and the discontinuous reception information to the user terminal,
wherein a detection duration used for cell detection and/or measurement is configured in the user terminal, based on the transmission cycle and the discontinuous reception cycle, irrespective of an ON duration that repeats in the discontinuous reception cycle.

8. A communication control method comprising:
transmitting, by a radio base station, transmission configuration information indicating a transmission cycle of a discovery signal and discontinuous reception information indicating a discontinuous reception cycle in a user terminal, to the user terminal; and
configuring, by the user terminal, a detection duration used for cell detection and/or measurement, based on the transmission cycle and the discontinuous reception cycle, irrespective of an ON duration that repeats in the discontinuous reception cycle.

* * * * *